INVENTOR
Richard L. Pryor
BY [signature]
Attorney

Aug. 5, 1969 R. L. PRYOR 3,460,094

INTEGRATED MEMORY SYSTEM

Filed Jan. 16, 1967 3 Sheets-Sheet 2

INVENTOR
Richard L. Pryor
By H. Christoffersen
Attorney

Aug. 5, 1969 R. L. PRYOR 3,460,094

INTEGRATED MEMORY SYSTEM

Filed Jan. 16, 1967 3 Sheets-Sheet 3

INVENTOR
Richard L. Pryor

BY H. Christoffersen
Attorney

United States Patent Office 3,460,094

Patented Aug. 5, 1969

3,460,094

INTEGRATED MEMORY SYSTEM

Richard L. Pryor, Cherry Hill, N.J., assignor to RCA Corporation, a corporation of Delaware Filed Jan. 16, 1967, Ser. No. 609,604
Int. Cl. G11b *13/00*
U.S. Cl. 340—172.5 4 Claims

ABSTRACT OF THE DISCLOSURE

A memory system comprising three integrated circuit memory arrays, each array formed with the same pattern of storage circuits. None of the arrays need be perfect but at any given storage location, the corresponding storage circuits of at least two of the three arrays must not be defective. To read out a storage location, the signals produced at the storage circuits of all three arrays at that location are applied to a three-input majority gate.

This invention relates to integrated circuit memory systems and, in particular, to an arrangement which makes solid state, integrated memory arrays both practical and useable even though a substantial portion of the semiconductive material or a large number of the memory elements of an array may be inoperable.

In the past few years, there has been increasing interest in the use of integrated circuits because of their low power dissipation, small size, and the high speed which is achievable due to the reduced lengths of the interconnections between circuits. Best advantage is made of these benefits and the cost per circuit element is reduced when entire systems or subsystems are fabricated as an integrated unit in or on a single chip or wafer. Of particular interest, largely for the aforementioned reasons, are large scale memory arrays for use in data processing equipments, such as computers.

At the present time, large integrated circuit memory arrays have not been realizable in practice due to poor yields. For example, the ability to fabricate a large memory array on a chip of semiconductor material in which all, or even almost all, of the memory elements are operable is almost nil. This is due primarily to the fact that few chips of adequate dimensions are wholly free of defective areas in the semiconductor itself. The same is true of devices in which semiconductive material is deposited at a large number of discrete locations on a wafer. Another factor is defects in the masks used in the manufacturing process, though this factor is diminishing in significance since better mask producing techniques are being developed.

Techniques are known for by-passing defective memory cells. For example, the addresses of defective memory cells may be stored in the user machine and, by a programming routine, the address of a good, spare cell may be substituted for the address of a defective cell each time the latter address is called for. This technique is not wholly satisfactory because the number and locations of defective cells varies from device to device. Moreover, programming time is required to substitute addresses.

It is one object of this invention to provide an improved integrated circuit memory system which does not suffer the disadvantages aforementioned.

It is another object of this invention to provide a semiconductive integrated memory system which is error free even though a substantial portion of the semiconductive material is defective.

It is a further object of this invention to provide an integrated circuit memory system in which compensation is made for defective areas without address substitution and in which the compensating is independent of the particular locations and/or sizes of the defective areas.

It is still another object of this invention to provide an error free memory system in which the number of external connections to each memory array is minimized.

It is yet another object to provide a novel method of producing an error free, integrated memory system.

In a system embodying the invention, a redundancy technique is employed, wherein each memory array appears in triplicate, i.e., once on each of three devices. The three devices are selected such that, for at least one relative orientation, the locations of defective semiconductive areas on each device are unique to that device. That is to say, no two devices have any defective semiconductive areas at corresponding locations. Identical, similarly oriented memory arrays are fabricated in or on the three devices. Corresponding outputs from the three arrays are applied as inputs to a majority gate individual to those outputs.

As an alternative, a similar memory array may first be fabricated in or on each of several chips or wafers. Three of these devices are selected on the basis that there are no defective storage cells at corresponding locations in any two of the selected devices. Corresponding outputs of the three arrays are applied as inputs to a majority gate individual to those outputs.

In a preferred embodiment of the invention, a minimized number of external connections to an integrated device is achieved when (1) each storage element in a memery array stores a bit of information of the same bit significance, and (2) the address decoder for the array of elements appears in or on the device. In the first case, corresponding output points of the plurality of storage elements in an array may be connected to a common bus.

In the accompanying drawing, like reference characters denote like components; and FIGURE 1 is a block diagram of a memory system embodying the principles of the invention;

Several fabrication techniques and types of devices are available and known in the art for manufacturing solid state integrated arrays. Among the several approaches are the monolithic silicon, metal-oxide-silicon (MOS), the thin film triode (TFT), and the silicon-on-sapphire. In both the monolithic and the MOS approaches, an array of solid state circuits (transistors and other circuit elements) is manufactured by fabricating the elements in or on a starting chip of semiconductive material, such as silicon, by means of deposition, diffusion, evaporation and other known techniques. In the case of the TFT approach, the integrated array of elements is produced by depositing, etc. the various elements, including the semiconductive material, adjacent one or more surfaces of an insulating wafer, such as glass. The semiconductive material, e.g. cadmium sulfide, may be deposited as a continuous film and then etched to provide discrete areas of semiconductive material, or the material may be deposited at discrete locations adjacent the surface of the insulating wafer, The same is true generally of the silicon-on-sapphire approach, wherein the insulator is a wafer of sapphire.

Figure 1:
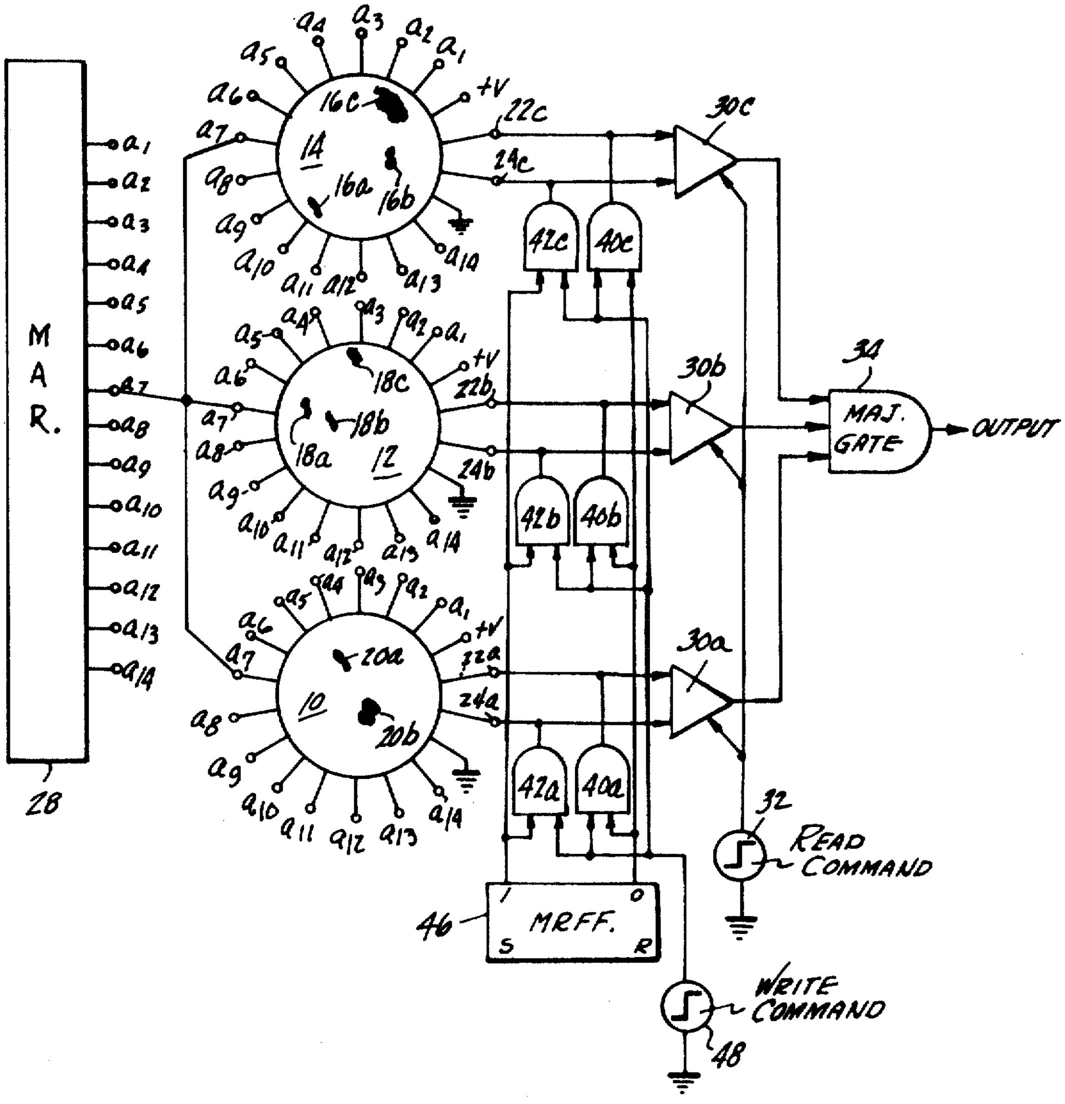

Three such devices are represented in FIGURE 1 by the circular members 10, 12, 14. Each of these devices may be either a chip of semiconductive material or a wafer having discrete areas of semiconductive material thereon. Several shaded areas are illustrated on each of the devices 10, 12, 14. These shaded areas, such as the areas 16*a*, 16*b*, 16*c* on device 14, represent defective areas in the several devices, and these defective areas may be either defects in the semiconductive material itself, or they may represent defective memory cells in a memory array.

Consider first that the shaded areas represent defective areas of semiconductive material. As stated previously, most silicon chips of adequate dimensions for a large memory array have defective areas in the semiconductive material. To a lesser degree, it is probable that there will be one or more areas of defective semiconductive material when the TFT or the silicon-on-shapphire approach is followed. According to one of my methods of producing an error free memory system, the three chips or wafers 10, 12, 14, as the case may be, are selected on the basis that, for at least one relative orientation of the several devices, there are no defective areas of semiconductive material at corresponding locations on any two or more of the devices. For example, when the several devices 10, 12, 14 have the relative positions illustrated in FIGURE 1, the defective areas 16*a*, 16*b* and 16*c* appear at locations on the chip 14 which are different from the locations of the defective areas 18*a*, 18*b* and 18*c* of the device 12 and the locations of the defective areas 20*a*, 20*b* of the device 10. In like manner, none of the defective areas 18*a*, 18*b* or 18*c* appears at a location on the device 12 which corresponds to the location of a defective area 20*a* or 20*b* on the device 10. Stated in another way, if the three devices 10, 12 and 14 were to be superimposed, no defective areas in two or more of the devices would be superimposed or lie over one another.

A like array of integrated circuit memory elements then is fabricated in or on each of the devices 10, 12, 14, wherein the several arrays are all similarly oriented relative to the positions of the devices 10, 12 and 14 illustrated in FIGURE 1. In the preferred form of the invention, a separate memory address decoder also is fabricated in or on each of the several devices 10, 12 and 14. A suitable example of a memory array and decoder will be discussed hereinafter.

According to a second of my methods, a separate, similar memory array first is fabricated in or on each of a large number of chips or wafers. Three of these devices, such as the devices 10, 12, 14 then are selected on the basis that no two or more of the selected devices have any defective memory cells at corresponding locations. In this event, the shaded areas 16*a*, 16*b*, etc. in FGURE 1 may represent areas of defective memory cells. As in the previous example, each device preferably includes its own decoder. Of course, in either approach, the decoder on each chip or wafer must be completely operative. In particular, in the case of silicon chips, the decoders must not be located at areas of defective silicon on the chip.

In integrated devices, it is preferable that the number of external connections to a chip or wafer be minimized. I have found that, in the case of large memory arrays employing the principles of my invention, the number of external connections is minimized by employing a memory organization wherein each cell of a device stores a bit of information of like bit significance. Thus, though for example, if a device such as any of the devices 10, 12, 14 has M memory cells, it may be organized into N words of X bits each (where $N \cdot X = M$). For the preferred embodiment the memory is organized so that there are N words, where $X=1$ and $N=M$ and each cell of a device stores a bit of information of like bit significance for a different one of the N words. In this way, the "1" outputs of all cells of a device can be coupled to one output terminal via a first common input-sense line, and the "0" outputs of all those cells can be connected to a second output terminal via a second, common input-sense line. Separate sets of three chips or wafers each then can be used for the different bits of the words, as in FIGURE 5 (to be described).

In the FIGURE 1 arrangement, therefore, it is assumed that all of the memory cells in devices 10, 12 and 14 have their "0" outputs coupled to the terminals 22*a*, 22*b* and 22*c*, respectively, and that all of the cells in devices 10, 12 and 14 have their "1" outputs coupled to the terminals 24*a*, 24*b* and 24*c*, respectively. Each of the devices 10, 12 and 14 also has a like set of terminals $a_1 \ldots a_{14}$, and two power supply terminals. One of the latter terminals of each device is shown as being grounded external to the device, and the other is connected to an external source of +V volts, such as a battery (not shown) having its negative terminal grounded.

The terminals $a_1 \ldots a_{14}$ are address input terminals. Like designated ones of these terminals of the three devices are connected together, although the connections are omitted for clarity of drawing. These sets of common connected terminals could be connected to the outputs of an external decoder. In that event, however, only fourteen cells of a device could be addressed. In the preferred embodiment, each device 10, 12, 14 has its own internal decoder, and each decoder has its inputs connected to the terminals $a_1 \ldots a_{14}$ of the respective device. A common memory address register of fourteen stages has its several outputs $a_1 \ldots a_{14}$ connected directly to the like designated terminals of each of the devices 10, 12, 14. Only the $a_7$ connection is shown for clarity of drawing.

As is known, a decoder which has fourteen binary inputs is capable of supplying an output selectively on any one of 16,384 output lines. Thus, in the preferred example, each memory array has 16,384 memory cells organized into 16,384 words of one bit each, and each cell of a device is uniquely addressed by the outputs of its decoder. Since the structures of the devices 10, 12 and 14 are identical, and since the like designated input terminals $a_1 \ldots a_{14}$ of the three devices are connected together, it follows that a corresponding memory cell in each of the devices10, 12 and 14 is addressed for any output condition of the address register 28.

The input-sense terminals 22*a*, 24*a* of device 10 are connected to the two different signal input terminals of a differential amplifier 30*a*; terminals 22*b* and 24*b* of device 12 are connected as inputs to a second differential amplifier 30*b*, and terminals 22*c* and 24*c* are connected to the inputs of a third differential amplifier 30*c*. Each amplifier 30*a*, 30*b*, 30*c* also has a control input which is connected in common to the output of a source 32 of control signals which provides enabling signals during a read operation. By way of example, the differential amplifiers may be transistor amplifiers each comprising a pair of transistors having their emitters connected in common to a respective control current source. The current source may be a third transistor which is biased either on or off in dependence upon the output of control source 32.

Like outputs of the three amplifiers 30*a*, 30*b* and 30*c* are coupled to different inputs of a three input majority gate 34. A majority gate is one whose output is determined by the majority of its inputs. For example, if any two or more inputs are binary "1," the output will be a binary "1" (or a "0," depending upon the particular gate). On the other hand, if any two or more inputs are binary "0," the output will be a binary "0" (or a "1," again depending upon the particular gate).

In the embodiment as described thus far, it will be recalled that, for any output condition of the address register 28, the corresponding memory cell in each of the devices 10, 12 and 14 is addressed by its decoder. Although several memory cells in each of the devices may be defective, no two corresponding memory cells are defective. Therefore, the majority gate 34 output always will have the correct value during a read operation, even though one of the addressed cells is defective.

To write information into memory, each of the devices 10, 12, 14 has a pair of write-in gates 40a and 42a, 40b and 42b, and 40c and 42c, respectively. Each of the gates 40a, 40b and 40c has its output connected to the input-sense terminals 22a, 22b and 22c, respectively, and each of the gates 42a, 42b and 42c has its output connected to the input-sense terminals 24a, 24b and 24c, respectively. A first input to each of gates 40a, 40b and 40c is coupled to the "0" output of a memory input register flip-flop 46, the "1" output of which is connected to a first input of each of the other gates 42a, 42b and 42c. A second input to each gate is connected to the output of a source 48 of write command signals.

Figure 2:
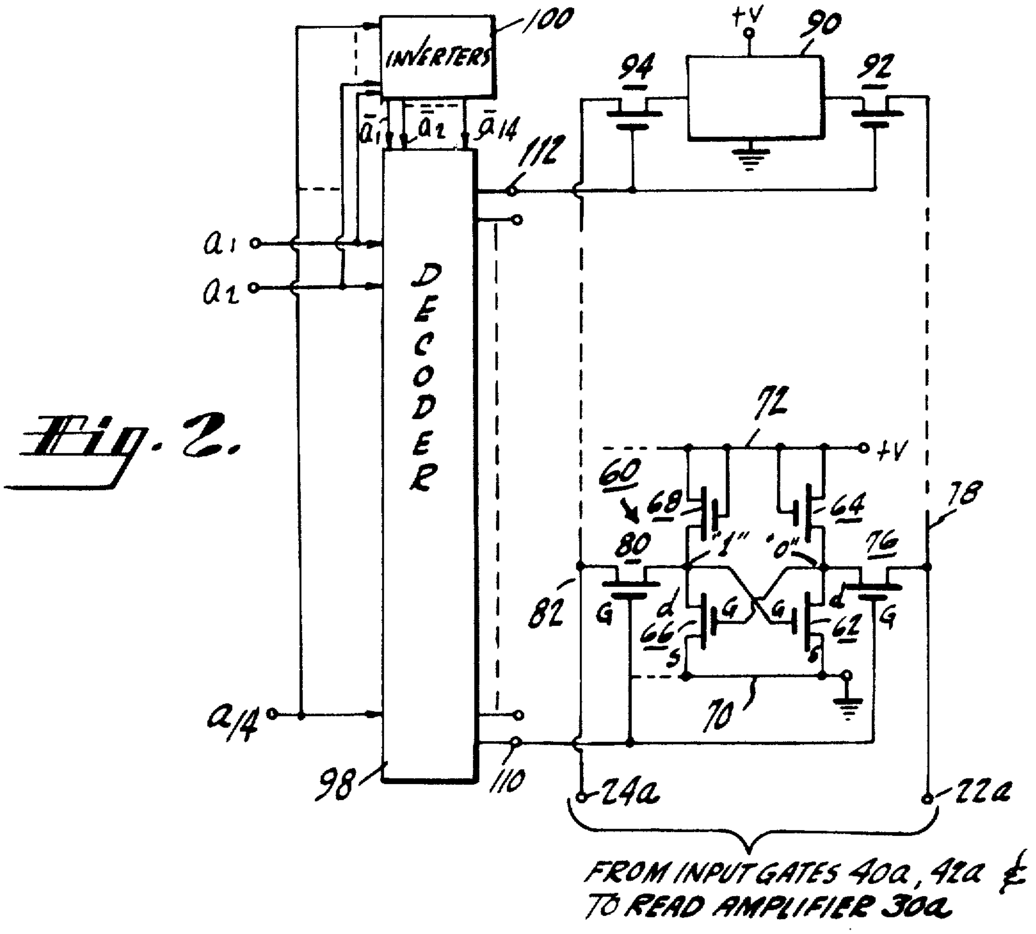
FIGURE 2 is a diagram of a memory cell and associated structure suitable for use in the system of FIGURE 1.

One example of a memory cell 60 and other circuitry, suitable for implementing the device 10, is given in FIGURE 2. The other devices 12 and 14 are similar. Cell 60 has four insulated-gate field-effect transistors, illustrated as N-type, which may be either TFT or MOS transistors. Transistors 62 and 64 have their source-drain paths connected in series between a ground bus 70 and a voltage bus 72, which buses are common to all memory cells and connect to the ground and +V volt terminals of the device 10. Transistors 66 and 68 are similarly connected. Transistors 64 and 68 have their gate electrodes connected to the voltage bus 72, whereby they function as loads in the drain circuits of transistors 62 and 66, respectively. Transistors 62 and 66 have their drain and gate electrodes cross-coupled to one another. This circuit arrangement is a flip-flop known in the art, whereby its operation will not be discussed.

A transmission gate transistor 76 has its source-drain path connected between the drain of transistor 62 and a first input-sense line 78, which line 78 is connected at the device terminal 22a. A second transmission gate transistor 80 has its source-drain path connected between the drain of transistor 66 and a second input-sense line 82, which line is connected to the device terminal 24a. In a similar manner, each of the other memory cell flip-flops in device 10 has its "0" and "1" output terminals coupled via transmission gate transistors to the input-sense lines 78 and 82, respectively. By way of example, the last flip-flop, represented by a box 90 has its "0" and "1" output terminals coupled via the source-drain paths of transistors 92 and 94, respectively, to the lines 78 and 82, respectively.

Figure 3:
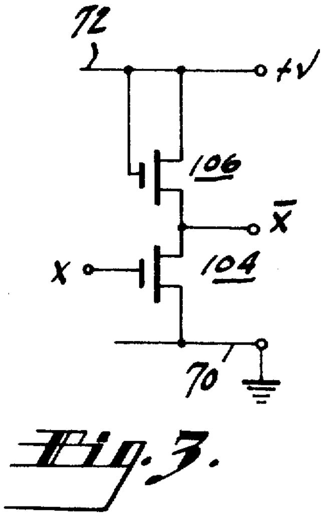
FIGURE 3 is a schematic diagram of an inverter circuit.

The decoder 98, which is fabricated in or on the same chip or wafer as the memory cells, also comprises N-type transistors and may be, for example, a tree type decoder. Decoder 98 has first inputs connected to the terminals $a_1 \ldots a_{14}$. These terminals also are connected to a set of inverters 100, the outputs of which are applied at a second set of input terminals to the decoder. An example of a suitable inverter is given in FIGURE 3 and comprises two N-type transistors 104 and 106 having their source-drain paths connected in series between the ground bus 70 and the +V volt bus 72. Transistor 106 operates as a load for transistor 104 by connecting its gate to bus 72. When the input $X$=zero volts, transistor 104 is biased off and the output $\overline{X}$ is +V volts. When $X=+V$ volts, transistor 104 is biased on and output $\overline{X}$ is then at ground potential.

Each memory cell has the gate electrodes of its two associated transmission gate transistors connected together and to an individual output of decoder 98. For example, the gate electrodes of transistors 76 and 80 of cell 60 are both connected to decoder output terminal 110; the gate electrodes of transmission gate transistors 92 and 94 of cell 90 are connected to decoder output terminal 112, etc. The decoder 98 is of a type which applies +V volts on the output line corresponding to the decoded address, and which applies ground potential on all its other output lines. Since the gate transistors are N-type, the gate transistors of all of the nonselected cells are biased off, effectively disconnecting those memory cells from the input-sense lines 78 and 82.

Figure 4:
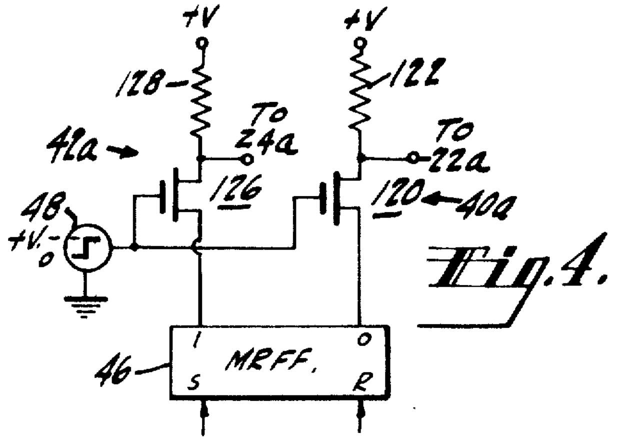
FIGURE 4 is a schematic diagram of suitable write input gates for use in the system of FIGURE 1.

The write gates 40a, 42a (FIGURE 1) are illustrated schematically in FIGURE 4. The other gates 40b, 40c, 42b and 42c are similar. Gate 40A comprises an N-type transistor 120 having its source connected to the "0" output terminal of flip-flop 46 and having its drain connected to the +V volt source via a load resistor 122. The drain also is connected to the terminal 22a of device 10. Gate 42a is similar, except that its drain is connected to the terminal 24a of device 10 and its source is connected to the "1" output of the flip-flop 46. Both transistors 120 and 126 have their gate electrodes connected to the source 48 of write command signals.

Consider now the operation, and let it be assumed that the "1" output of flip-flop 46 is at +V volts and the "0" output is at ground potential. In the absence of a write pulse, both transistors 120 and 126 (FIGURE 4) are biased off. Let it also be assumed that cell 60 (FIGURE 2) is being addressed, i.e. the voltage at decoder output terminal 110 is at +V volts and all other outputs are at ground potential. When the output of write control source 48 rises to +V volts, transistor 120 (FIGURE 4) turns on. The voltage at the device 10 terminal 22a then falls to ground potential, while the voltage at terminal 24a remains at +V volts. With ground potential applied to the input-sense line 78 (FIGURE 2), transmission gate transistor 76 turns on and applies ground potential at the drain of transistor 62 and at the gate of transistor 66. Transistor 66 then turns off (assuming it was on), its drain voltage ("1" output) rises to +V volts and transistor 62 turns on, lowering its drain voltage ("0" output) to ground potential. Thus, the information in flip-flop 46 has been written into cell 60 in device 10. Similarly, the same information is written into the corresponding cells of devices 12 and 14 via gates 40b and 40c, respectively.

Consider now the read out operation of cell 60. Decoder 98 applies +V volts at the gates of both transmission gate transistors 76 and 80 (FIGURE 2). Input-sense lines 78 and 82 are connected via terminals 22a and 24a to + V volts via load resistors 122 and 128, respectively (FIGURE 4). Since the "1" output of cell 60 is at +V volts, transmission gate transistor 80 remains off, and the voltage on input-sense line remains +V volts. However, the "0" output of cell 60 is at ground potential. Consequently, transistor 76 turns on and drives the voltage on input-sense line 78 to ground potential. The same is true in devices 12 and 14. On the other hand, if cell 60 had been storing the complement, i.e. its "1" output were zero volts and its "0" output were +V volts, transmission gate transistor 80 would have turned on to lower the voltage on input-sense line 82 to ground potential.

The outputs of the three devices 10, 12 and 14 are supplied to amplifiers 30a, 30b, and 30c, respectively (FIGURE 1), and the outputs thereof are applied at the inputs to majority gate 34. Since no two corresponding memory cells are defective, the majority gate 34 output always has the correct value during a read operation. It is thus seen that, by the techniques described, an error free memory system results even though several of the memory cells of an array may be defective.

Figure 5:
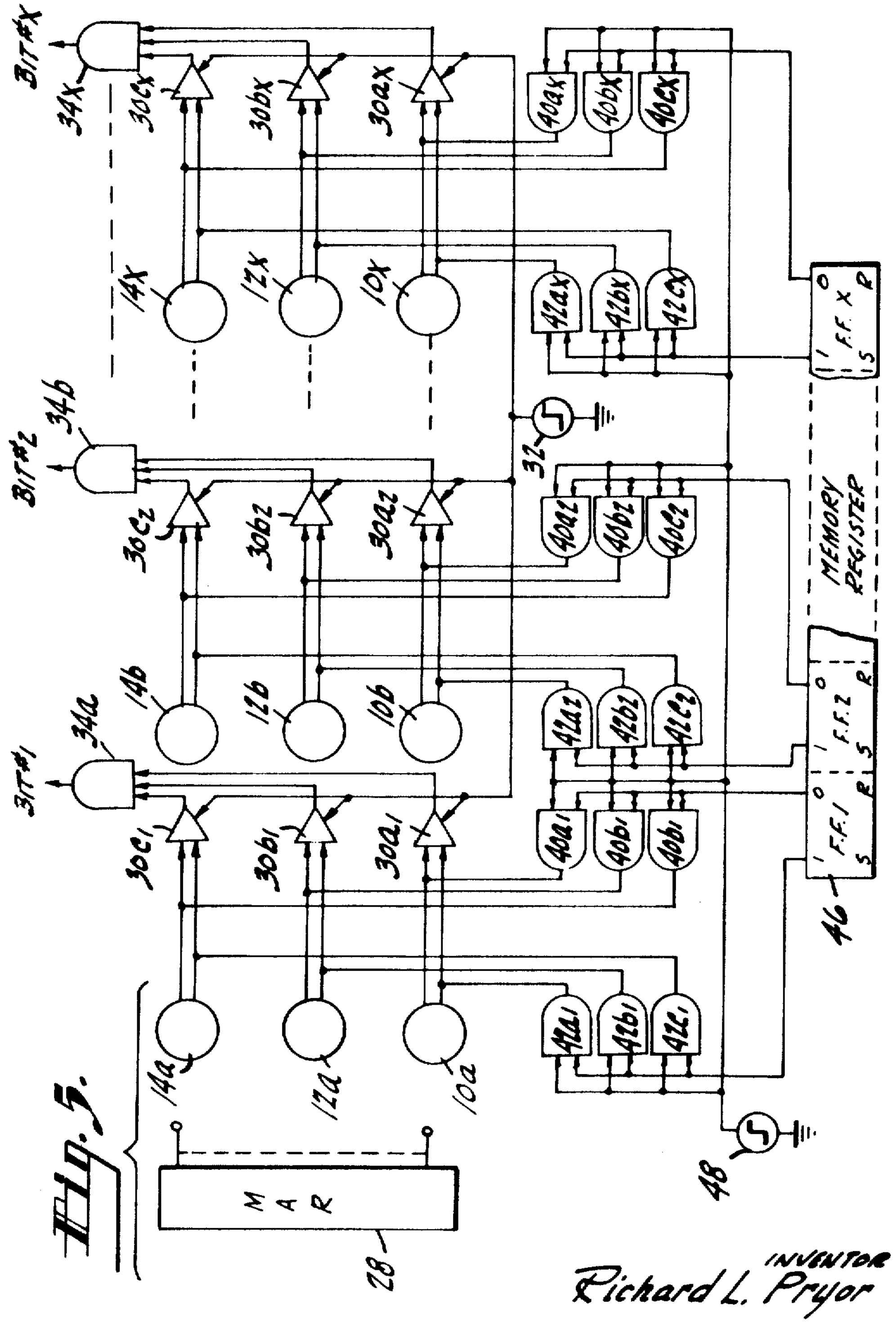
FIGURE 5 is a block diagram of a multi-bit word memory system embodying the principles of the invention.

A multibit word memory may be provided by employing several sets of three devices each, wherein the cells of each different set store the information for a different bit of the words. Such an arrangement is illustrated in FIGURE 5. There, each of the devices 10a, 12a, and 14a stores the first bits of information for the several words; each of devices 10b, 12b and 14b stores the second bits of information; and each of devices 10x, 12x and 14x stores the $x^{th}$ or last bits of information for the words. Each of the several devices is structurally identical. The like-numbered address input terminals (not shown) of all of the devices are connected together and to the like-numbered outputs of the memory address register 28. These connections are omitted for clarity of drawing.

Additionally, each set of devices, e.g. devices 10*a*, 12*a* and 14*a* has its own set of amplifiers, e.g. 30*a*1, 30*b*1 and 30*c*1, and its own majority gate, e.g. gate 34*a*. Further, each set of devices has its own set of write-in gates, and each such set of gates is driven from a different flip-flop in the memory input register 46. By way of example, the gates 40*a*1, 40*b*1, and 40*c*1 of the first set each have one input connected to the "0" output terminal of the first flip-flop in register 46, and the gates 42*a*1, 42*b*1 and 42*c*1 of the first set each have one input connected to the "1" output terminal of the first flip-flop. The gates in all of the sets each have a second input connected to the output of the source 48 of write command signals. Also, all of the amplifiers 30*a*1, 30*b*1 . . . 30*cx* in the several sets have their control inputs connected to the common source 32 of read command signals.

The aforementioned embodiments of memory organization are given by way of example only, and not intended to preclude the use of other memory organizations or memory cells. For example, one could use a memory organization of the type illustrated and described in the Patent 3,275,996 of J. R. Burns. In that event, of course, the memory system shown there would appear in triplicate, and the outputs of the corresponding read devices, e.g. 22, of FIGURE 1 therein, would be applied to majority gates.

What is claimed is:

1. In combination:

*n* integrated circuit memory arrays, where *n* is an odd integer greater than one, each array formed with the same pattern of integrated storage cells, said arrays having cells some of which may be defective, not more than $n-1/2$ arrays having defective storage cells at corresponding locations;

an output terminal from each array transmitting a signal when the storage cell then coupled to that terminal is read out in parallel with corresponding cells in the other arrays; and an *n* input majority gate coupled to said output terminals for producing an output signal indicative of the state of the majority of the signals it receives from said output terminals.

2. The combination as claimed in claim 1 wherein *n* equals three.

3. The combination as claimed in claim 1 wherein each integrated circuit memory array includes therein its own decoder and interconnections between the storage cells and the outputs of the decoder.

4. The combination as claimed in claim 2 including several, similar sets of three memory arrays each, wherein all of the storage cells of a set store bits of like significance and wherein the storage cells of different sets store bits of different significance, and wherein the storage cells of different sets store bits of different significance, and including a separate, external majority gate for each set of memory devices, each said gate having three inputs, and each different input to any gate being coupled to the output of a different one of the memory devices associated therewith.

References Cited

UNITED STATES PATENTS

| | | | |
|---|---|---|---|
| 3,175,198 | 2/1965 | Burns | 340—173.1 |
| 3,226,569 | 12/1965 | James | 340—146.1 |
| 3,275,996 | 9/1966 | Burns | 340—173 |
| 3,312,954 | 4/1967 | Bible et al. | 340—172.5 |
| 3,366,930 | 1/1968 | Bennett et al. | 340—172.5 |

ROBERT C. BAILEY, Primary Examiner

H. E. SPRINGBORN, Assistant Examiner